United States Patent [19]

Moss et al.

[11] 4,386,742
[45] Jun. 7, 1983

[54] SPINNING REEL HOUSING WITH AN IMPROVED ACCESS OPENING AND REMOVABLE CAP

[75] Inventors: Elvis W. Moss, Tulsa; Richard L. Gifford, Adair, both of Okla.

[73] Assignee: Brunswick Corporation, Skokie, Ill.

[21] Appl. No.: 289,034

[22] Filed: Jul. 31, 1981

[51] Int. Cl.³ ............................................. A01K 89/00
[52] U.S. Cl. .............................. 242/84.1 R; 220/298; 242/84.2 R
[58] Field of Search ...................... 242/84.2 R, 84.2 A, 242/84.2 G, 84.2 B, 84.21 R, 84.2 A, 84.1 R; 220/301, 398

[56] References Cited

U.S. PATENT DOCUMENTS 2,733,502  1/1956  Luther ................................. 220/301
3,010,673  11/1961  Marconi ............................. 220/298
3,223,347  12/1965  Clark ............................ 242/84.2 A

FOREIGN PATENT DOCUMENTS 471218  9/1937  United Kingdom ......... 242/84.21 R
498460  1/1939  United Kingdom ......... 242/84.21 R Primary Examiner—Billy S. Taylor
Attorney, Agent, or Firm—John G. Heimovics

[57] ABSTRACT

A closed face spinning reel has a housing with an opening affording access to the reel mechanism. The opening is closed by a removable cap. The cap is seated on a radial flange in the opening and has legs on its inner surface which engage cap locking surfaces on the inner face of the flange. Means are further provided to warp the cap to exert an inward force upon the flange to hold said cap within the opening.

10 Claims, 11 Drawing Figures

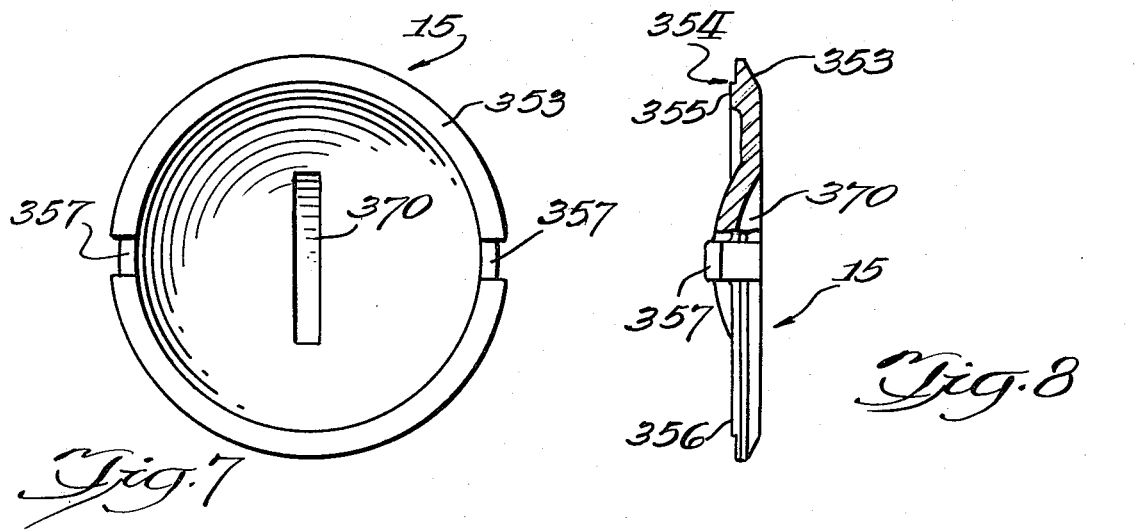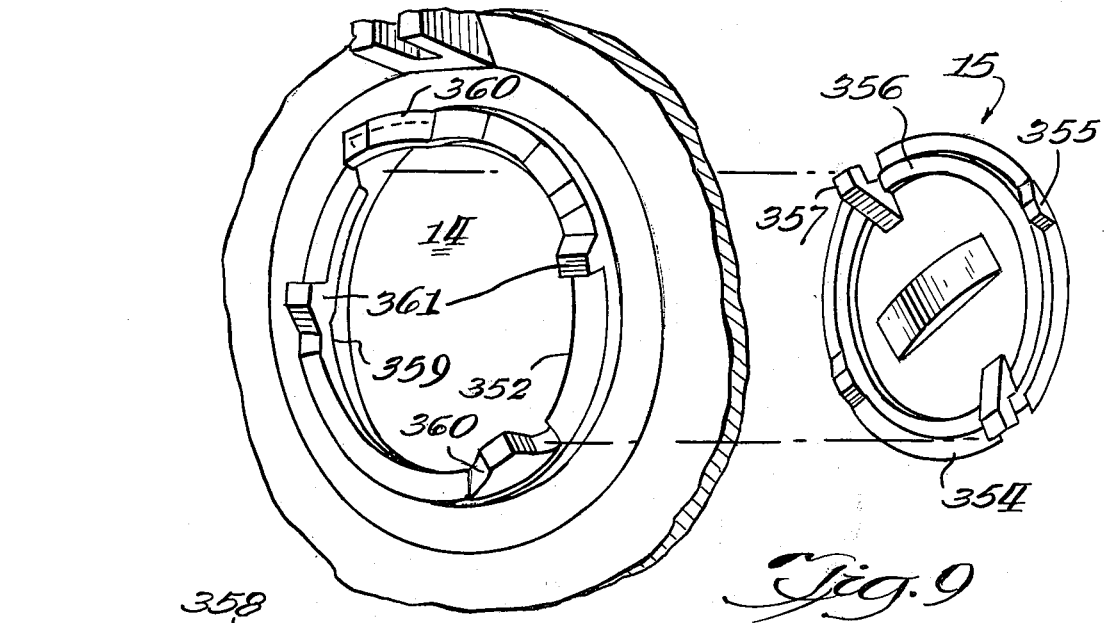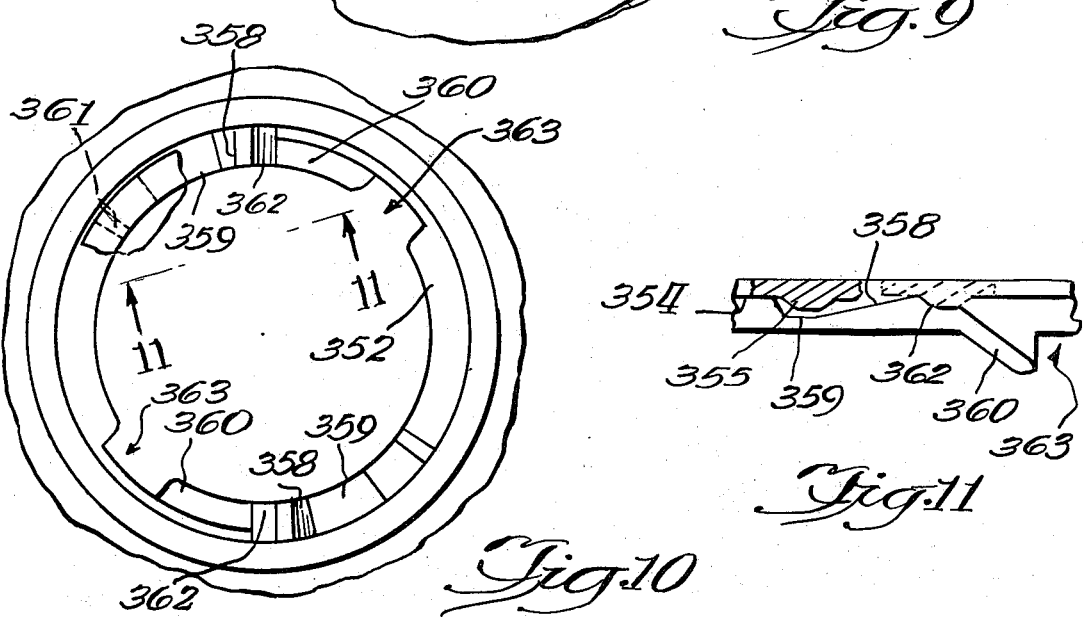

SPINNING REEL HOUSING WITH AN IMPROVED ACCESS OPENING AND REMOVABLE CAP

TECHNICAL FIELD

This application relates to a closed face spinning reel and more particularly to the housing for the reel with an access opening and removable cap.

BACKGROUND ART

Closed face spinning reels typically have a body on which the reel mechanism is mounted, with front and rear housing members defining an enclosure for the reel. When it is desired to have access to the mechanism, as to clean and lubricate it or to dry it if it should become wet, one must disassemble the housing. This requires at least a proper screw driver. Care must be taken not to lose parts or to damage the mechanism.

One solution to the foregoing, has been to provide the reel enclosure with an access opening covered by a removable cap. The cap, to be properly secured within the opening has a plurality of resilient lugs, which upon rotation of the cap, engage a flange within the opening and exert a bias against the flange to hold the cap in place. However, the resiliency of the lugs, tends to permit the cap to be rotated past its proper locked position.

The reel of this application overcomes one or more of the problems set forth above.

DISCLOSURE OF THE INVENTION

In one aspect of the invention, the reel enclosure is provided with an opening which affords access to the mechanism and with a removable cap which closes the opening.

More particularly, a center opening is provided in the back housing of the reel mechanism enclosure and has a radial flange on which the cap is seated. The cap has lugs on its inner surface which engage cap stop surfaces on the inner face of the radial flange to locate the cap in the locked position. The cap also has, on its inner surface, detents which cooperate with cam surfaces on the outer face of the radial flange to induce a warping effect upon the cap thereby maintaining the cap in the locked position.

BRIEF DESCRIPTION OF THE DRAWINGS

FIG. 7 is an elevational view of the outer surface of the cap;

FIG. 8 is another fragmentary side view of the cap;

FIG. 9 is an exploded perspective of the portion of the housing surrounding the opening and of the cap, taken from inside the rear wall;

FIG. 10 is a fragmentary view of the locking surfaces on the outer face of the flange; and FIG. 11 is a sectional view taken along line 11—11 of FIG. 10 showing the position of detents in the cap in locked and unlocked positions.

BEST MODE FOR CARRYING OUT THE INVENTION

Figure 1:
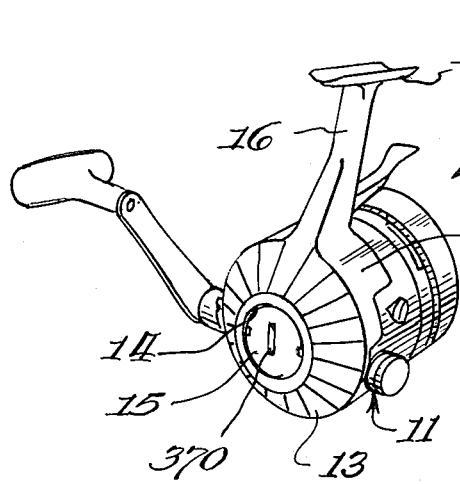
FIG. 1 is a perspective view of a back of a reel showing a support housing embodying the invention.
Figure 2:
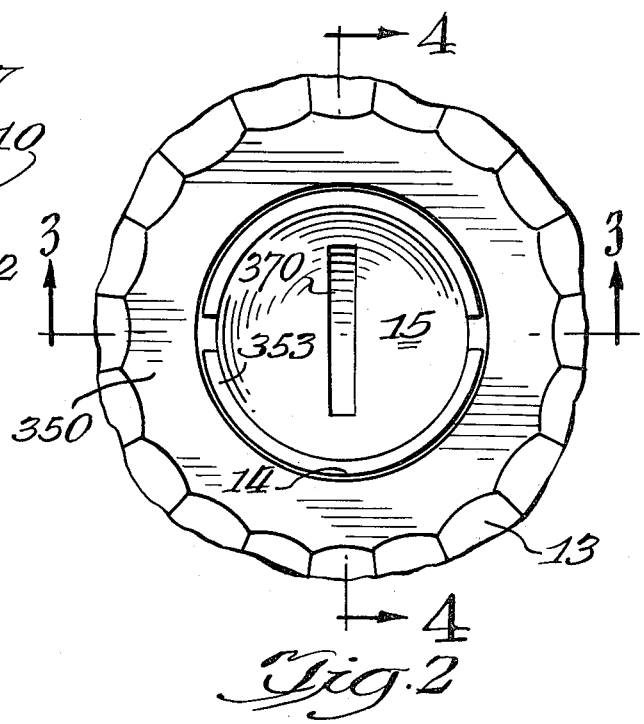
FIG. 2 is a rear elevational view of the reel back support housing and cap.
Figure 3:
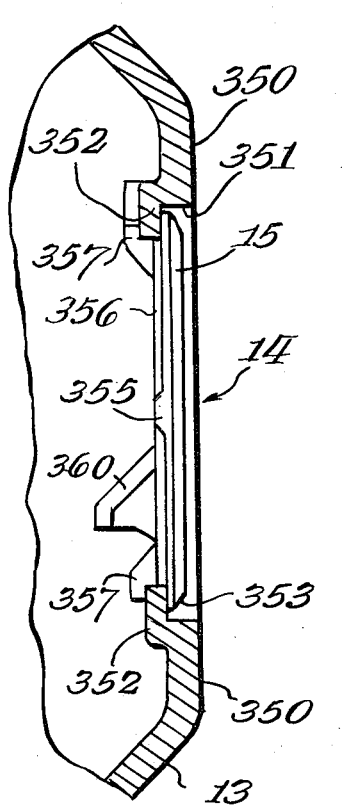
FIG. 3 is an enlarged fragmentary section taken along line 3—3 of FIG. 2.
Figure 4:
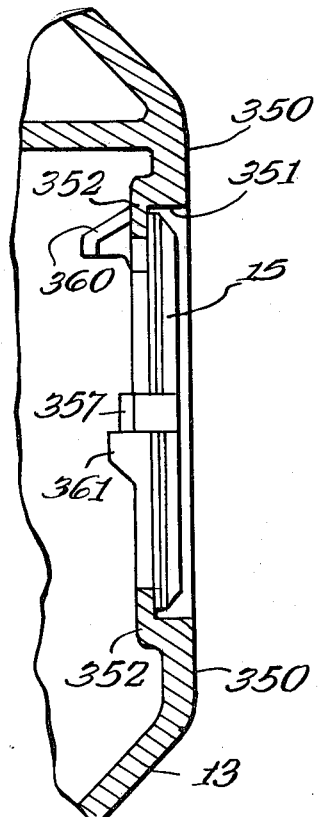
FIG. 4 is an enlarged fragmentary section taken along line 4—4 of FIG. 2.
Figure 5:
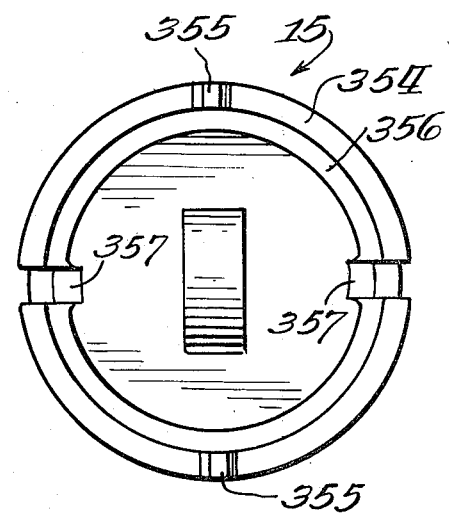
FIG. 5 is an enlarged elevation of the inner surface of the cap.
Figure 6:
FIG. 6 is a fragmentary side view of the cap.

FIGS. 1 and 2 generally depict a back support housing 11 for a spinning reel 10. While the invention hereinafter described is directed to a closed face spinning reel due to the limited accessibility to the reel mechanism housed therein, the following invention could be applied with equal efficiency to other types of reels such as open face spinning reels.

The back support housing 11 has a cylindrical cover 12, one end of which is open to receive and mount the remainder of reel and the other end of which merges into a conical rear wall 13 having a central access opening 14 to receive a back cap 15. A stem 16 is integrally cast with the cylindrical cover 12 and has a mounting foot 17 which is used to attach the back support housing 11 and the entire reel to a fishing rod (not shown).

Turning to FIGS. 3-11 an embodiment of the back cap 15 and the access opening 14 of this invention are shown in more detail. The access opening 14 has a planar, circumferential lip 350 at the rearward extremity of the rear wall 13. A peripheral wall 351 extends axially inwardly from lip 350 and terminates at a radially directed flange 352 upon which the cap 15 seats.

The cap 15 is preferably of a molded plastic material and has a planar outer surface with a chamfered peripheral edge 353. A coin slot 370 is disposed in the outer surface for rotation of the cap 15. Located on the inside of the cap 15 is a peripheral inner surface 354 having a pair of diametrically opposed trapezoidal detents 355. An annular rib 356 located radially inward and adjacent to the peripheral inner surface 354, engages the inner face of the flange 352 and centers the cap 15 in the access opening 14.

A pair of diametrically opposing locking lugs 357 are provided on the inner surface 354 of the cap 15. The lugs 357 are spaced 90° from the detents 355. Each lug 357 is spaced inwardly from the peripheral inner surface 354 and projects away from the inner surface and outward toward the periphery of the cap 15. The lugs 357 are of square or rectangular cross-section and are relatively rigid.

The outer face of the flange 352 on the reel includes a pair of diametrically opposed, outwardly extending cams 358, FIGS. 10 and 11, adjacent to, merging with and disposed clockwise of, as best seen in FIG. 11, a pair of recesses 359. Clockwise of each cam 358, the flange 352 has a trapezoidal seat 362 to mate with the detents 355 and a slot 363 to permit the lugs 357 to, when the cap 15 is inserted into the opening 14, pass through the flange 352 and become located for engagement with the inner face of the flange 352. An exit ramp 360 is disposed within each slot 363 and tapers inward and away from the seats 362.

On the inner face of the flange 352 on the reel, spaced approximately 90° from each cam, are stops 361 which, when engaged by the rigid lugs 357, locate and maintain the cap 15 in the locked position.

To secure the cap 15 within the opening 14, the cap 15 is placed over the opening 14 such that the lugs 357 pass through the slots 363 and the rib 356 is coaxially aligned with the inner edge of the flange 352. This also locates the detents 355 within the recesses 359 due to the orthogonal orientation of the lugs 357 with respect to the detents 355 and the slots 363 with respect to the recesses 359. Turning the cap 15 clockwise as seen in the drawings, as with a coin inserted in the coin slot 370, causes the detents 355 to move from their respective recesses 359 to outwardly follow the cams 358 and matingly seat in the seats 362 with the lugs 357 engaging the stops 361.

Because the lugs 357 and inner surface 354 of the cap 15 effectively trap or sandwich the flange 352 therebetween, the following of the cams 358 by the detents 355 and their subsequent disposition in the seats 362 exerts a stressing or warping effect upon the planar cap 15. This warping effect causes the inner surface 354 in the proximity of the lugs 357 to somewhat bow to exert a force upon the flange 352 thereby firmly and interferingly holding the cap 15 to the flange 352. The warping effect also forces the detents 355 down upon the seats 362 to frictionally maintain their engagement. The aforementioned warping of the cap 15 and the resultant effects thereof, securely fasten the cap 15 to the flange 352 and, more particularly, to the back support housing 11. Furthermore, since the lugs 357 are rigid, their engagement of the stops 361 prevents further rotation of the cap 15 past its proper locked position.

The axial dimension of the cap 15 between inner surface 354 and its outer surface is less than the axial extent of the wall 351 around the opening 14 so that the cap 15 when seated on the flange 352 is recessed within the opening.

To remove the cap 15 for access to the enclosed parts of the reel, the cap 15 is rotated counterclockwise. The detents 355 move over the cams 358 to return to the recesses 359 on the flange 352 relieving the forces induced by the warping effect upon the cap 15. Continued rotation causes the lugs 357 to engage the ramps 360 resulting in an outward force upon the cap 15 which, in turn, causes the cap to axially lift from the opening 14.

We claim:

1. In a spinning reel (10) having a back housing (11) with an opening (14) for access into the interior of the reel and having a removable cap (15) to seat in and close said opening (14), the improvement comprising:
    a flange (352) within said opening (14) providing a seat for said cap (15);
    said cap (15) having at least one lug (357) to engage said flange (352), said cap (15) movable from a first, removable position to a second, closed position where said lug (357) traps said flange (352) to hold said cap (15) to said flange (352);
    means (361) for stopping the movement of the cap (15) at said second position;
    means (355,358) for warping said cap (15) at said second position to forcibly secure said cap (15) to said flange (352) including at least one cam (358) on said flange (352) engageable by at least one detent (355) on said cap (15); and
    at least one seat (362) is provided to hold said detents (355) in said second position.

2. In the spinning reel as claimed in claim 1 wherein said stopping means has at least one stop (361) disposed for engagement by said lug (357).

3. In the spinning reel as claimed in claim 2 wherein said cap (15) has a pair of diametrically opposed lugs (357).

4. In a spinning reel as claimed in claim 3 wherein said cap (15) has an inner surface (354) and said lugs (357) project from the inner surface (354) of the cap (15) to trap said flange (352) between the cap (15) inner surface (354) and said lugs (357).

5. In a spinning reel as claimed in claim 4 wherein said lugs (357) are rigid.

6. In a spinning reel as claimed in claim 1 wherein said warping means includes at least one cam (358) on said flange (352) engagable by at least one detent (355) on said cap (15).

7. In a spinning reel as claimed in claim 1 wherein a pair of diametrically opposed cams (358) and a pair of diametrically opposed detents (355) are provided.

8. In a spinning reel having a back housing (11) with an opening (14) for access into the interior of the reel and having a removable cap (15) to seat in and close said opening (14), the improvement comprising:
    a flange (352) within said opening (14) providing a seat for said cap (15) and having inner and outer faces, said flange (352) having a pair of diametrically opposing stops (361) on the inner face thereof;
    said cap (15) having a pair of diametrically opposing lugs (357), said cap (15) movable from a first, removable position to a second closed position at which said lugs (357) engage said stops (361) and trap said flange (352) to hold said cap (15) thereto; and
    means (355,358) for warping said cap (15) at said second position to forcibly secure said cap (15) to said flange (352) including a pair of cams (358) on the outer face of said flange (352) engageable by a pair of detents (355) on the inner face (354) of said cap (15).

9. In a spinning reel as claimed in claim 8 wherein said cams (358) are diametrically opposite and disposed orthogonal to said stops (361).

10. In a spinning reel as claimed in claim 8 or 9 wherein seats (362) are provided adjacent to said cams (358) to receive said detents (355) when said cap is in said second position.

* * * * *